Patented Jan. 14, 1941

2,228,737

UNITED STATES PATENT OFFICE 2,228,737

PROCESS FOR TESTING APPARATUS FOR LEAKS

John Gudbrand Tandberg and Carl Eric Arvid Damsberg, Stockholm, Sweden, assignors, by mesne assignments, to Servel, Inc., New York, N. Y., a corporation of Delaware No Drawing. Application August 31, 1938, Serial No. 227,772. In Germany September 3, 1937

5 Claims. (Cl. 23—230)

This invention relates to a process for detecting leaks in pipes and vessels, especially those formed of iron or ferrous metal, and it is an object of the invention to provide an improved process for detecting leaks which will give a correct and true leak indication.

It has already been proposed to test vessels and the like for leaks by subjecting the same to compressed air and covering the outer surfaces with soap water, whereby any leaks will be indicated by soap bubbles in the liquid film. This process of testing vessels for leaks generally is satisfactory when the leaks are relatively large. In testing hermetically closed vessels which operate under internal pressure, such as, for example, refrigeration apparatus of a continuous absorption type, the foregoing process for testing apparatus for leaks is not sufficiently accurate and exact.

In testing hermetically closed vessels operating under internal pressure, for example, it has been proposed to charge closed refrigeration apparatus with an ammonia solution and to coat the outer surfaces of the apparatus with a chemically effective indicator which will change its color at any place of leakage on account of the alkaline reaction of the ammonia. In order to observe this change in color more readily, it has also been suggested to mix an indicator with a pigment, such as zinc oxide, for example. The indicator most frequently used is phenolphthalein which in itself is normally colorless and will become red on account of the hydrogen ion concentration (pH) of the ammonia.

It has now been found that the red coloring of phenolphthalein or the change in color of other indicators influenced by the hydrogen ion concentration is not absolutely dependable. The indicator will sometimes change its color even when no leaks are present and no ammonia passes through the walls of the apparatus being tested. Study has shown that such erroneous indications are caused by phenomena which occurs at the outer surfaces, especially at the contact surface of the indicator coating and the iron surface of the apparatus being tested. It is believed that galvanic surface currents are produced which bring about changes in the hydrogen ion concentration and thus a change in the color of the indicator.

In accordance with this invention, in order to overcome the objection of false leak indications, an indicator is employed which will remain indifferent or neutral with respect to the surface with which it comes in contact so that its indication condition will not be influenced by the same. The invention will be described in further detail in connection with specific illustrations given by way of example, whereby further characteristic features of the invention will become apparent.

Let us assume, for example, that refrigeration apparatus of a continuous absorption type is to be tested for tightness. Such apparatus is well known and of the kind generally described in Hainsworth Patent No. 2,037,782. Apparatus of this type contains refrigerant, absorption liquid, and an auxiliary pressure equalizing gas. The refrigerant and absorption liquid may be ammonia and water, respectively, and the auxiliary gas may be hydrogen. The different parts or elements of the apparatus are formed of ferrous metal and permanently secured together, as by welding, to provide a hermetically closed system which may be operated at a total pressure of 25 atmospheres.

In testing refrigeration apparatus of this type in accordance with the invention, the apparatus is immersed in a bath and the apparatus observed for possible leaks. As one specific illustration of the invention which is given by way of example, the bath may consist of a mixture of water, chalk, potassium dichromate, and phenolphthalein. The proportion of these substances is approximately 2,000 parts in weight of water, 1,000 parts in weight of chalk, 10 parts in weight of potassium dichromate and 5 parts in weight of phenolphthalein (first dissolved in alcohol). In place of potassium dichromate another water soluble dichromate, such as sodium dichromate, for example, may be used. The color of this bath is yellow and it gives the apparatus a yellow appearance. If the apparatus has a leak at any place, ammonia, either dissolved in water or mixed with auxiliary gas, will pass through the apparatus to the outer surface thereof whereby the yellow appearing film will turn to red.

In this specific example the indicator proper, namely, the phenolphthalein, is not specific to the testing substance, namely, ammonia. In other words, its indicating condition is changed not only by ammonia. Processes which may possibly take place in the surface layer of the ferrous metal apparatus, such as corrosion or rusting, for instance, could bring about a reaction of the indicator. This is prevented in the specific example given by the addition of dichromate to the bath. The alkali dichromate acts as a corrosion inhibitor on the surfaces of the apparatus being tested for leaks.

Instead of immersing the apparatus to be tested in a bath, the entire apparatus or individual parts thereof can be coated with the indicator. When this is done it is advisable to replace the addition of chalk by the addition of zinc oxide.

In the testing of steam boilers, autoclaves, and receptacles having large surface areas and requiring relatively large quantities of a testing substance therein, it is advisable to select a testing substance or product for which there exists a specific and sensitive low priced indicator. In the specific illustration given above, for example, the ammonia serving as a refrigerant is also used as the testing substance in testing for possible leaks in the refrigeration apparatus. Particularly in the detection of small leaks, it is valuable to use a gaseous agent, such as ammonia, because this gas can easily be detected even when it is diluted by an auxiliary gas such as hydrogen or nitrogen.

The invention can be successfully used in general in all situations where it is desired to test for tightness articles made of common and ordinary metals. In following the teachings of the invention it is only necessary to choose an indicator which will remain indifferent or neutral with respect to the surface being tested in the event that possible chemical processes will take place that would in themselves give a false leak indication. The indicator is made neutral or indifferent by the addition to the indicator which makes the same passive, or by treating the surface of the article to be tested before the application of the indicator.

What is claimed is:

1. In a method of testing apparatus for leaks with an indicator which changes color responsive to change in hydrogen ion concentration and a testing fluid which passing through a leak causes said change in hydrogen ion concentration, the improvement which consists in supplying on the surface of said apparatus where the indicator is applied an alkaline dichromate to prevent a false indication by change in hydrogen ion concentration due to oxidation or galvanic action at said surface upon application of the indicator.

2. The method improvement as set forth in claim 1 in which said indicator is phenolphthalein.

3. The method improvement as set forth in claim 1 in which said indicator is phenolphthalein and said alkaline dichromate is sodium dichromate.

4. The method improvement as set forth in claim 1 in which said indicator is phenolphthalein and said testing fluid is ammonia.

5. An indicator for ammonia leak testing including phenolphthalein and an alkaline dichromate.

JOHN GUDBRAND TANDBERG.
CARL ERIC ARVID DAMSBERG.